(12) United States Patent
Studer

(10) Patent No.: US 10,981,237 B2
(45) Date of Patent: Apr. 20, 2021

(54) DEBURRING TOOL FOR DEBURRING TRANSVERSE RECESSES THAT BRANCH FROM A MAIN BOREHOLE

(71) Applicant: Heule Werkzeug AG, Balgach (CH)

(72) Inventor: Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 0 days.

(21) Appl. No.: 16/275,080

(22) Filed: Feb. 13, 2019

(65) Prior Publication Data
US 2019/0255627 A1 Aug. 22, 2019

(30) Foreign Application Priority Data
Feb. 16, 2018 (EP) .................................... 18157116

(51) Int. Cl.
*B23C 3/12* (2006.01)
*B23C 5/02* (2006.01)
(Continued)

(52) U.S. Cl.
CPC .............. *B23C 3/12* (2013.01); *B23B 51/105* (2013.01); *B23C 5/02* (2013.01); *B23C 5/24* (2013.01);
(Continued)

(58) Field of Classification Search
CPC ... B23C 3/12; B23C 2210/72; B23C 2220/20; B23C 2260/84; B23C 2245/00
See application file for complete search history.

(56) References Cited

U.S. PATENT DOCUMENTS 5,755,538 A * 5/1998 Heule .................. B23B 51/101
408/154
9,908,183 B2 3/2018 Faessler et al.

FOREIGN PATENT DOCUMENTS

| CN | 104302428 A | 1/2015 |
|---|---|---|
| DE | 2559145 A1 | 7/1977 |

(Continued)

OTHER PUBLICATIONS

English translation of WO 2016135283 (Year: 2015).*
(Continued)

*Primary Examiner* — Alan Snyder
(74) *Attorney, Agent, or Firm* — Wood Herron & Evans LLP

(57) ABSTRACT

A deburring tool (7) for deburring of edges of transverse recesses (3, 3a-i), which diverge from a main borehole (2), consisting of a shaft (8, 9) driven to turn about the tool axis (11), which is deployable and retractable in the forward feed direction into the main borehole, and on the lower end of which at least one knife window (26) is arranged, in which at least one spring-loaded knife (10, 10', 10", 10''', 10'''') is arranged roughly perpendicular to the tool axis (11), so as to be shiftable, which on its front end has at least one cutting edge (10a, 10b) which encounters the edge of the transverse recess (3, 3a-i), and deburrs same, wherein the knife (10, 10', 10", 10''', 10'''') consists of two cutting edges (10a, 10b) opposite in the rotational direction (12, 13), which act to cut equally for the right and left passes (12, 13), with one cutting edge (10a) being configured to cut for the rightward pass (12), both in forward motion (38a) and in rearward motion, and the other cutting edge (10b), being configured to cut for the leftward pass (13), both in forward motion (38a) and in rearward motion, and that the two cutters (10a, 10b) with their cutting edges are placed at a slant and with arch shape at an angle between 0° and 90°, but preferably (Continued)

Figure 1:
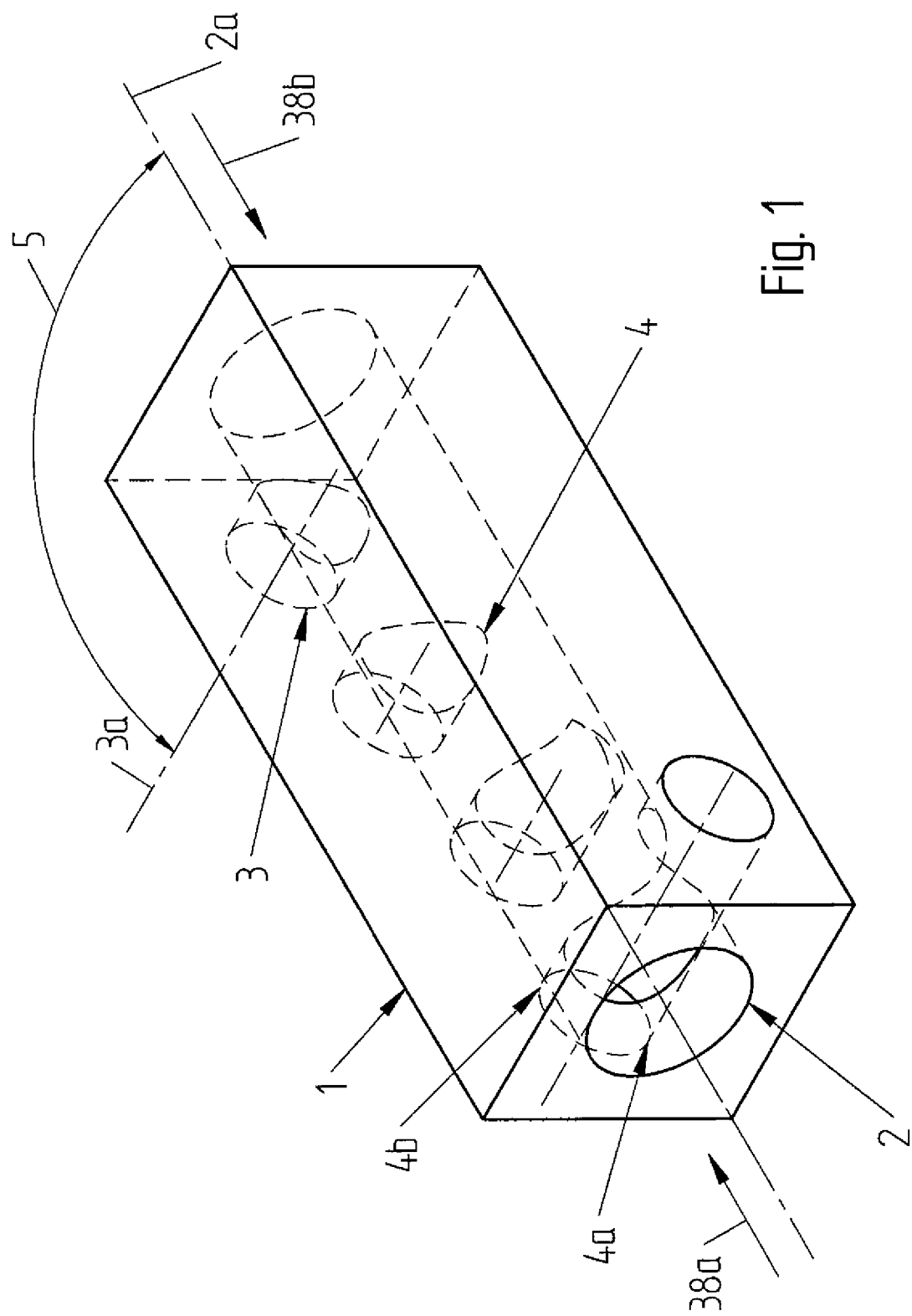

between 5° and 45° to the tool axis (11) and thus to the longitudinal axis (2*a*) of the main borehole (2).

15 Claims, 14 Drawing Sheets

(51) Int. Cl.
*B23C 5/24* (2006.01)
*B23B 51/10* (2006.01)

(52) U.S. Cl.
CPC ....... *B23B 2220/08* (2013.01); *B23B 2251/14* (2013.01); *B23C 2210/0407* (2013.01); *B23C 2210/084* (2013.01); *B23C 2210/12* (2013.01); *B23C 2220/20* (2013.01); *B23C 2245/00* (2013.01)

(56) References Cited

FOREIGN PATENT DOCUMENTS

| | | |
|---|---|---|
| DE | 2525872 B2 | 1/1979 |
| DE | 2649208 C3 | 1/1980 |
| DE | 19711206 A1 | 10/1997 |
| JP | H01-92310 U | 6/1989 |
| JP | H01-155107 U | 10/1989 |
| JP | 2009-125625 A | 6/2009 |
| KR | 10-2014 0136495 A | 11/2014 |
| WO | 2016/135283 A1 | 9/2016 |

OTHER PUBLICATIONS

Chinese App. No. 201910120337.9 First Office Action dated Mar. 2, 2020.
Japanese App. No. 2019-025009 Reasons for Refusal dated Sep. 29, 2020; Search Report.

* cited by examiner

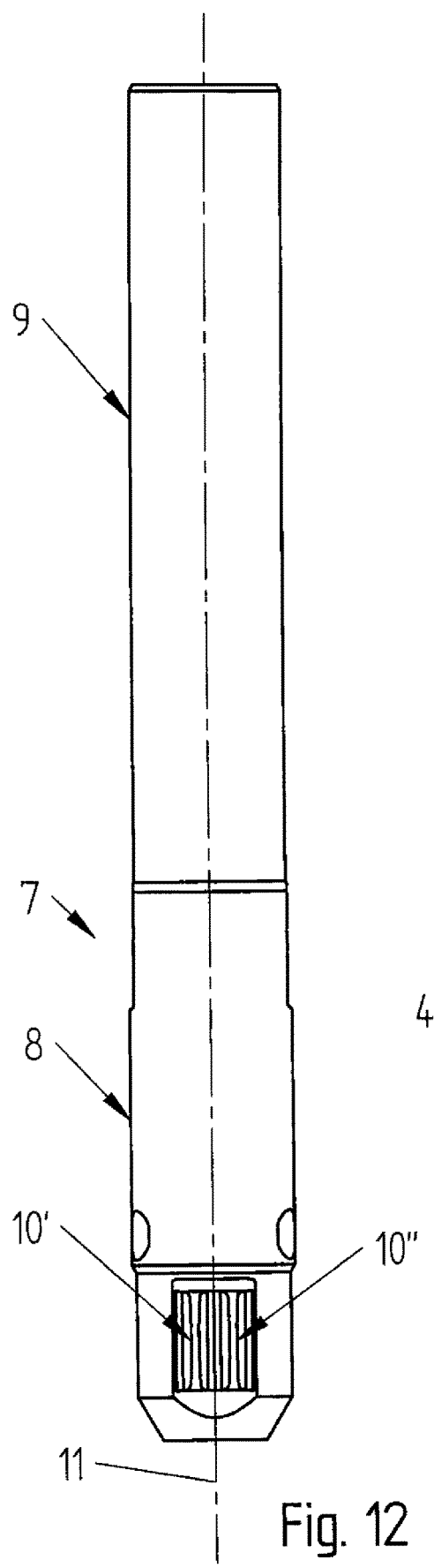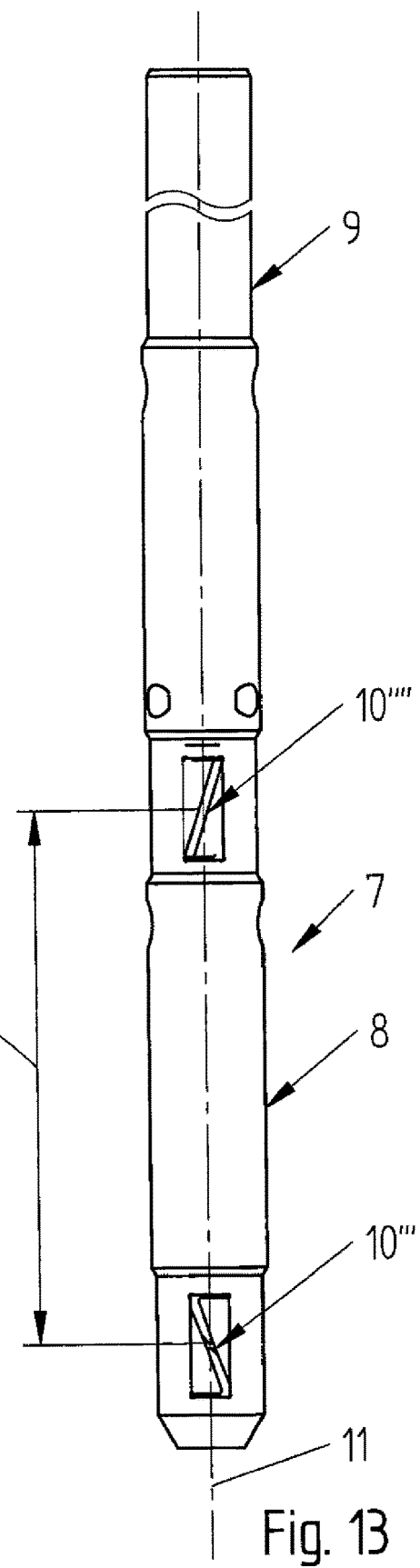

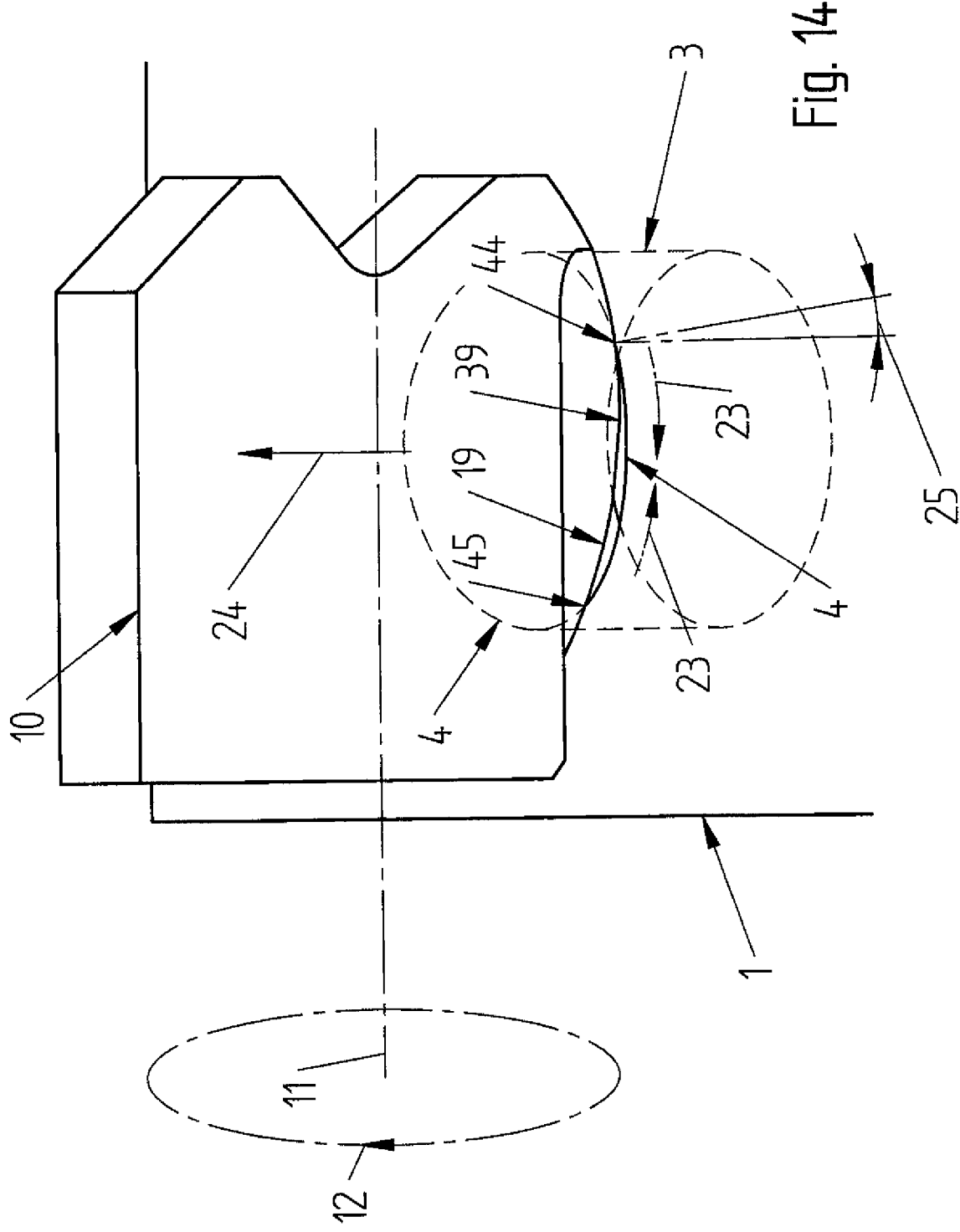

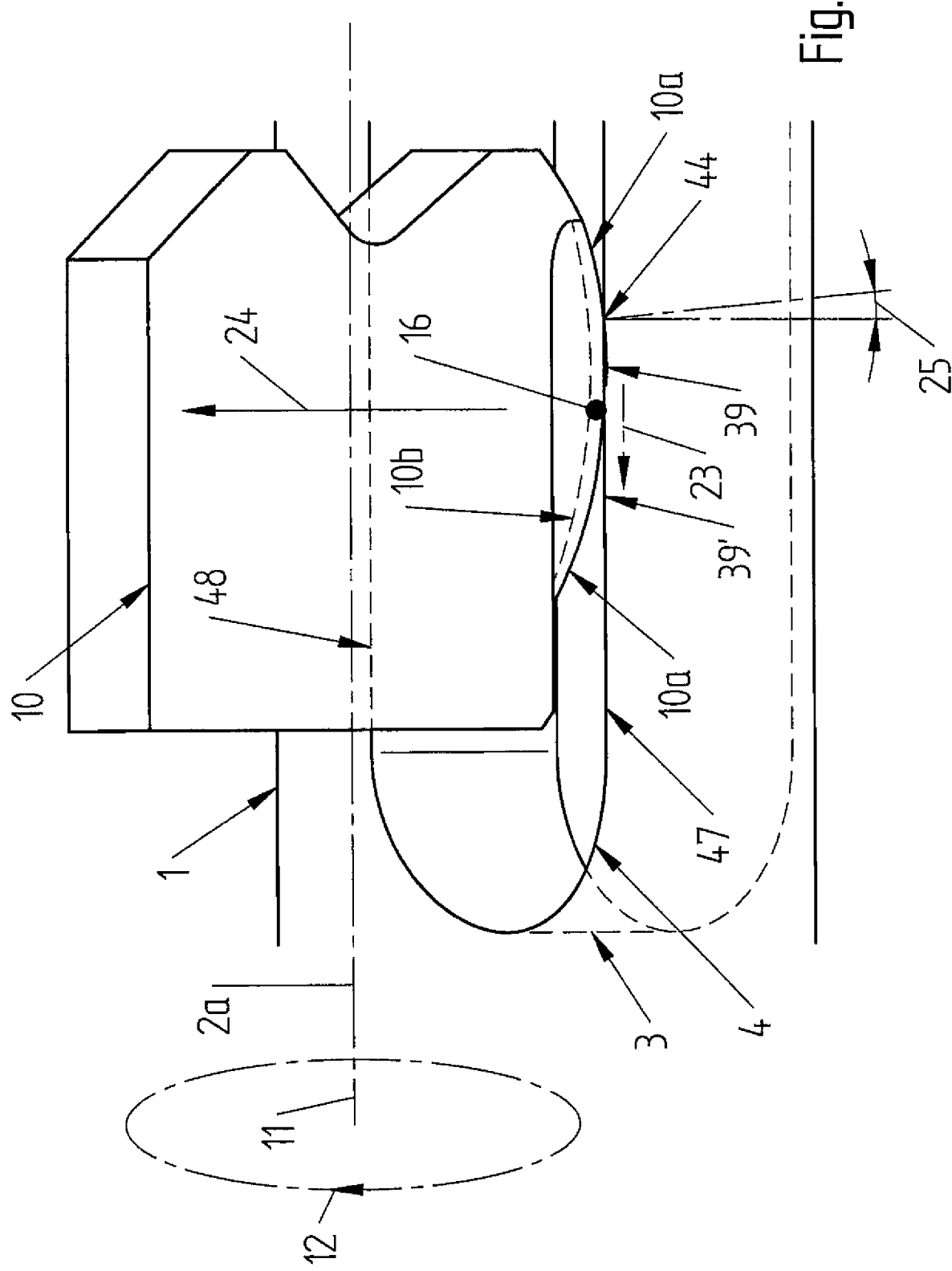

DEBURRING TOOL FOR DEBURRING TRANSVERSE RECESSES THAT BRANCH FROM A MAIN BOREHOLE

The invention relates to a deburring tool for deburring transverse recesses in a main borehole according to the preamble of patent claim 1.

With the object of WO 2016/135283 A1, such a deburring tool has become known, which is characterized in that a first cutting segment of the cutting edge and a second cutting segment of the cutting edge are present, which are arranged on the particular end areas of the cutting edge, the first cutting segment having a first wedge angle and the second cutting segment having a second wedge angle and the two wedge angles being arranged to be spatially offset to each other.

The drawback of such a known deburring tool is that deburring of the recess edges of transverse recesses, which intersect the main borehole, is not sufficiently successful, because the cutting edges are not set at a slant to the longitudinal axis of the main borehole, and therefore apply no paring step in the area of the recess edges which intersect with the main borehole and run into same.

Consequently, no paring, cutting-removal step takes place on the burrs ejected by the drilling or milling tool, but rather only an impact motion, which produces chatter marks on the edges of the transverse recess to be deburred, which is perceived as disadvantageous.

The known debarring tool could also be operated in rightward and leftward passes to conduct a deburring.

Thus there exists a drawback in that the first edge of a recess must be deburred in a rightward pass of the tool, and the opposite edge of the same recess must be deburred in a leftward pass of the tool, which involves increased labor expenditure.

In DE 25 25 872 B2, another deburring tool for cutting-removal processing of the opening edge of boreholes is known, in which a turning driven shaft is present with a movable cutting body arrangement held by a radial groove on the shaft, with at least two wedge-shaped cutters placed opposite each other, wherein the cutters arranged on separate cutter bodies are guided in spring-loaded fashion in the radial direction in a knife window of the shaft.

Such a deburring tool is only suitable for deburring of boreholes in a main borehole, and not for deburring of the circumferential edges of transverse recesses running transverse to the main borehole.

The inventions named in the publications DE2525872B2, DE2559145A1 and DE2649208C3 provide no indication of the invention-specific object and solution to it.

In all of these protective rights, the cutting geometry is unsuited for deburring of transverse recesses which adjoin the main borehole:

a) The cutters act only one rotational direction (as a rule rightward) and do not permit the transverse recess edges to be deburred in circumferential fashion.

All of the blades shown there exhibit a clearance angle which is not characterized as cutting in a leftward pass.

b) In contrast to the invention, the cutting edges are not overall configured to be convex and arch-shaped, which prevents a paring cutting with simultaneous forcing of the knife out of the transverse recess.

The shapes of the cutting edges, as they are depicted in DE2525872B2 and DE2559145A1, unavoidably result in knife breakage when used for deburring of transverse recesses, if the deburring occurs outward from the main borehole.

DE2649208C3 does mention deburring of edges of through-running boreholes; however this form of knife likewise exhibits the drawbacks mentioned above. Additionally, in this publication, the knives act in diametrically opposing fashion and are kinematically coupled via the rocker. This leads to a further drawback, that a knife on the main borehole wall opposite the transverse recess adjoins the gliding surface and hinders the other knife, via this mechanical coupling, in penetrating into the transverse recess. In the best case this kind of penetration deburring permits the burr to be separated at the height of the main borehole wall, with a part of the burr being pressed in practice into the transverse recess, and the deburring is incomplete.

Therefore, the object, based on WO 2016/135283 A1, is to further develop a deburring tool of the type mentioned initially, so that the quality of deburring in the recess edges of a transverse recess, which intersects the main borehole, is better, and that deburring is faster.

To attain the set object, the invention is characterized by the technical teaching of claim 1.

The drawbacks of the prior-art deburring tools are eliminated by the novel cutting shape.

From this arises an advantage in that a deburring of transverse recesses can occur proceeding from the main borehole, which is in contrast to the prior art as per WO 2016/135283 A1.

A preferred embodiment of the invention consists in the knife consisting of two cutting edges lying opposite in the rotational direction, which act with equal cutting for the right and left passes, with the one cutting edge configured for the rightward pass and the other cutting edge for the leftward pass, and that the two cutters with their cutting edges are set at a slant and have an arch shape with their cutting edges in an angle between 0° and 90°, but preferably between 5° and 45° to the tool axis, and thus to the longitudinal axis of the main borehole.

With the given technical teaching there arises an advantage in that due to the slanted, arch-shaped cutting edges—in contrast to the prior art, where perpendicular cutting surfaces were present—now the invention-specific cutting edges lying opposite one another carry out a paring cut along the recess edges of the transverse recess. It is important that the cutting edges be curved throughout and configured to be continuous, and not divided into segments, as in WO 2016/135283 A1.

The term "continuous" means that the particular cutting edge extends with constantly convexity and is arch-shaped over the entire cutting surface of the cutting knife—preferably over its side wall—and is not segmented.

Owing to the arch-shaped (convex) configuration, a roughly central vertex point or a vertex zone is formed, to knock off the metallic burrs on the circumferential edge of the transverse recess according to the invention at a specific place with a specific angular rotation of the shaft. The arch-shaped convex cutting edges, configured to be continuous throughout, make it possible for the knife to run along continuously on the edges of the transverse recess and remove the burrs present in a specific circumferential area of the transverse recess due to a short angular turning motion of the shaft, with a paring cut.

The tool shaft is driven to turn and moves centrically, or also eccentrically in an axial direction in the central axis of the main borehole with a preferable forward speed of 600 mm per minute.

An eccentric insertion (outside the central middle axis of the main borehole and radially offset to the main borehole)

of the tool shaft into the main borehole, and a corresponding process of deburring are likewise possible. True, only a radially limited segment area of the transverse recess on the circumference of the main borehole can be reached and deburred, which can be preferred with certain applications.

For the sake of simpler description, however, we proceed in the following specification from a deburring tool inserted centrically into the main borehole, although the invention is not limited to this.

Preferably the shaft turns continuously and rotates at a rotational rate in the range between 1 r.p.m. to 1000 r.p.m.

Such deburring tools are preferably used for the deburring of transverse recesses on the inner walls of the main borehole for diameters of main boreholes ranging between 4 mm and 30 mm. The axial length of such a deburring tool ranges between 50 mm and 350 mm.

The one knife or the plurality of knives radially project between 0.25 mm and 0.50 mm over the bore diameter of the main borehole and beyond the outer diameter of the knife window, and, upon being inserted into the main borehole by this amount, are spring-loaded and pressed back into the particular knife window of the deburring tool, to then, upon reaching a transverse recess in the inner wall of the main borehole, be pressed radially outward from the knife window, to thereby deburr the circumferential edges of the transverse recess. Consequently, the size data between 0.25 and 0.5 mm are the radial operating stroke of one or more knives.

After carrying out the first angular turning motion, by which, at a certain place on the circumferential area of the main borehole a first deburring has taken place, the tool shaft moves further with a simultaneous axial forward shift by a second short angular turning motion of the shaft and thus the deburring knives lift away from the edge of the transverse recess and move with a further turning motion of the shaft at another location on the circumference of the main borehole wall into the transverse recess, in order at this additional location on the edge of the transverse recess to remove the burrs present there in a second deburring action.

If, as per the prior art, the cutting edge of the deburring tool were segmented, there would be limited success in removing the cutting knife from the transverse recess, because the segments possibly would again reshape the already deburred recess edges of the transverse recess and knock new metallic burrs out of the metallic material, which should be avoided.

Therefore, the invention is not drawn upon the arrangement of a first and second wedge angle as per WO 2016/135283 A1, and likewise not on a clearance angle lying between them, because the control surface as per the invention in an ideal case must be oriented by 90° to the tool axis, so that the cutting edges perform cutting actions continuously for the right and left passes, simultaneously over the entire arch.

The method of deburring proceeding from the main borehole obviates the clearance angle on the knife, as known from prior art, because the clearance angle from positioning of the cutting edge and the deburring contour arise corresponding to the cutting angle 25.

A third cutting segment, as with prior art, is also done away with. The presence of such a third cutting segment, with the invention-specific deburring process based on the main borehole, would disturb the constant motion sequence of the arc cutter, thereby taking the knife out of the cut and impairing the deburring quality.

It is also important that the deburring occurs in the area of the transverse recesses intersecting the main borehole from the main borehole, and not the reverse—as with prior art—proceeding radially from the transverse recess in the direction of the main borehole not processed.

Here is the difference from the prior art, because prior art deburrs the recess edges of the transverse recesses from without, while the present invention performs the deburring action radially outward from the main borehole in the direction of the recess edges of the transverse recess that are cutting there.

It is true that the named publication also describes a deburring outward from the main borehole in the direction of the radially attached transverse recess, which however is only made with a segmented cutting element, which leads to a danger of damage to the recess edges intersecting the main borehole.

It is advantageous that the cutting edge of the knife is configured to be continuous and constant, and is not subdivided into two cutting edges that are spatially displaced from each other.

The prior-art cutting edges that are spatially displaced from each other presuppose a first deburring in the leftward pass and a second deburring in the rightward pass, which is just what the invention avoids. With the invention, the two diametrically opposite cutting edges cut simultaneously both in the rightward and in the leftward pass.

In what follows, the invention is explained in greater detail using drawings depicted multiple embodiment paths. Based on the drawings and descriptions of same, further features and advantages of the invention are derived that are essential to the invention.

Figure 2:
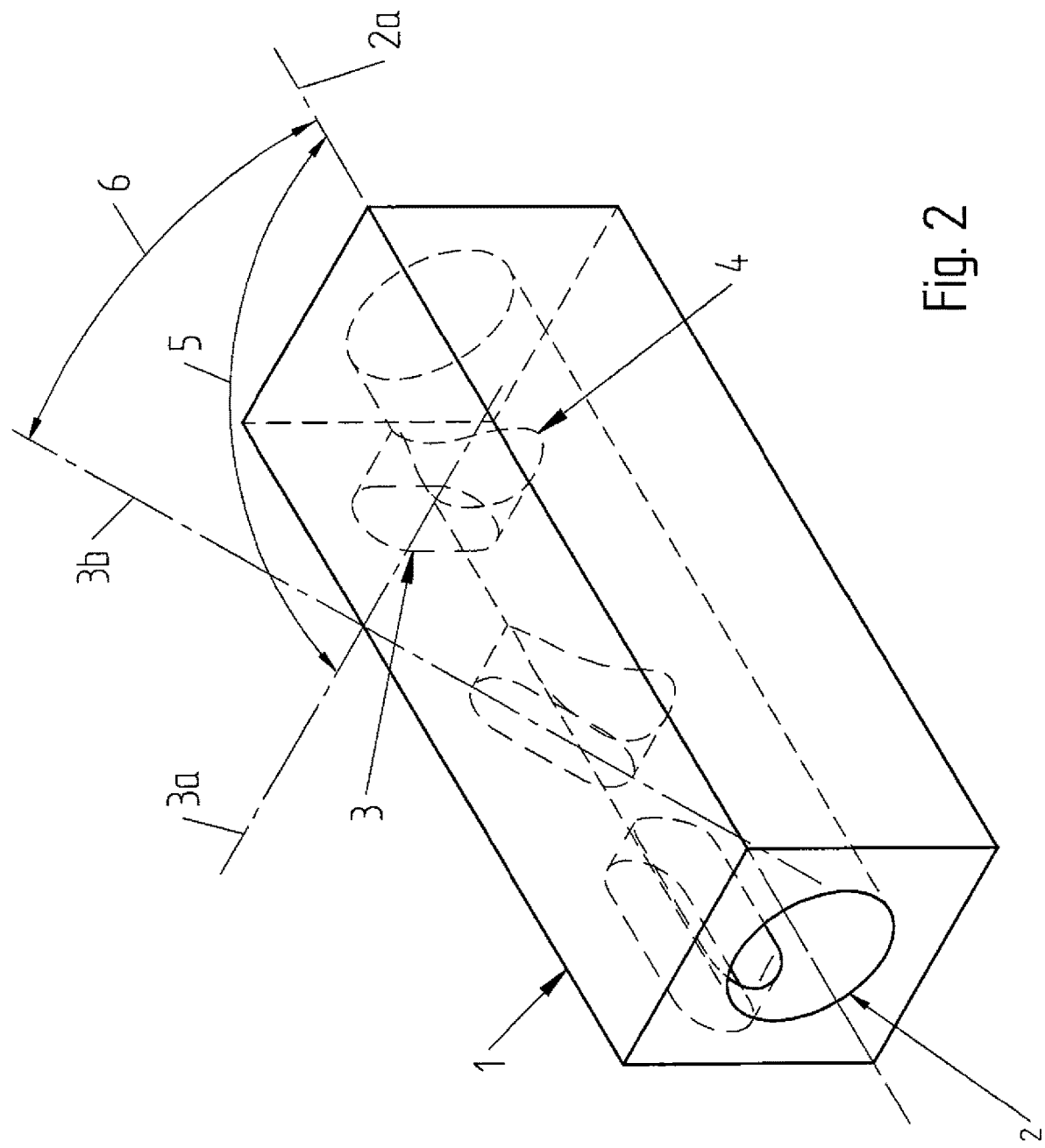
Figure 3:
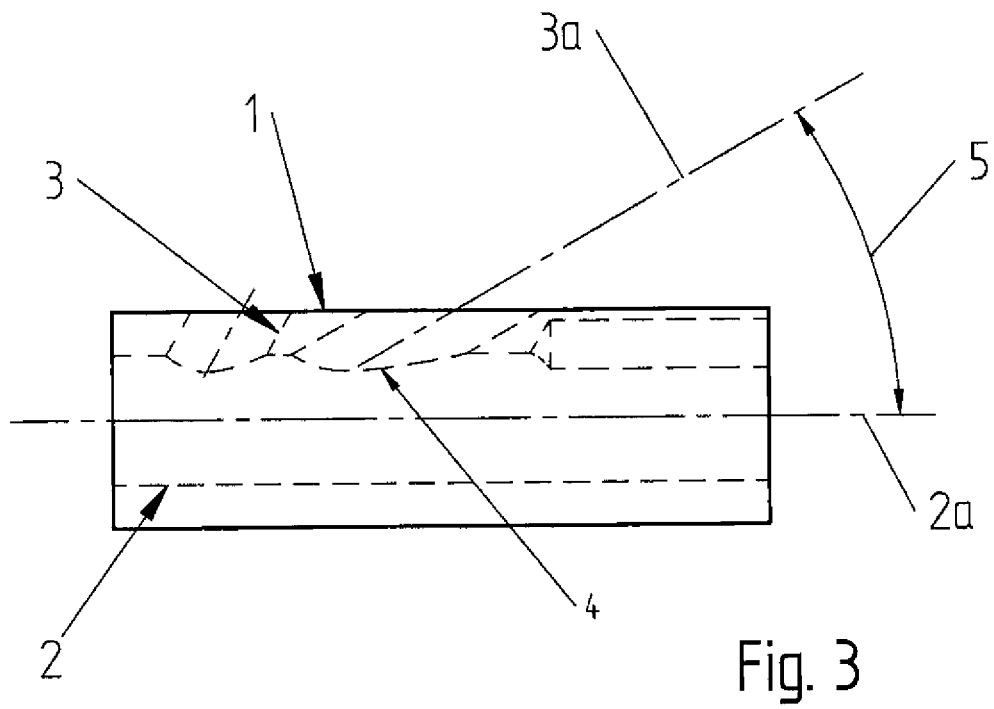
Figure 4:
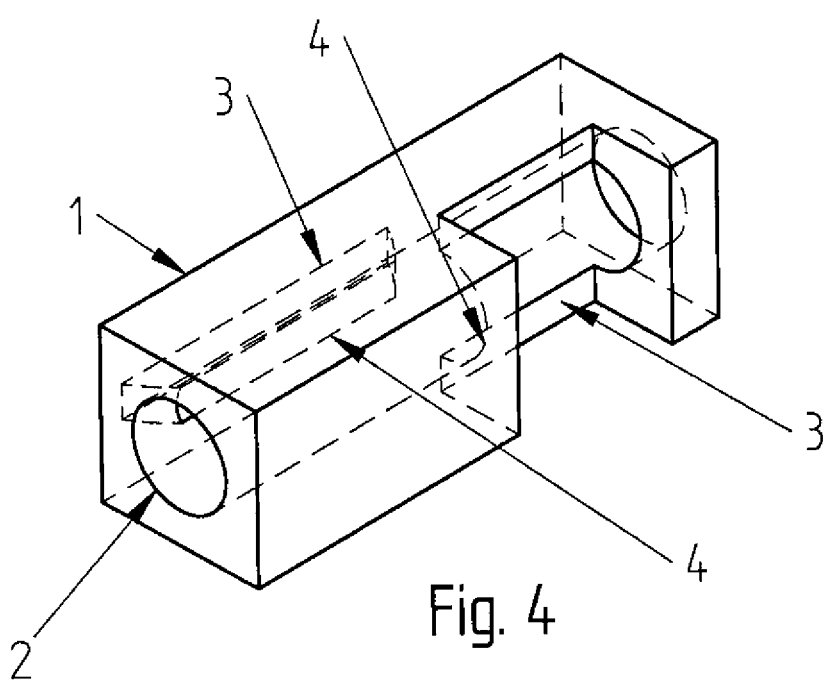
Figure 5:
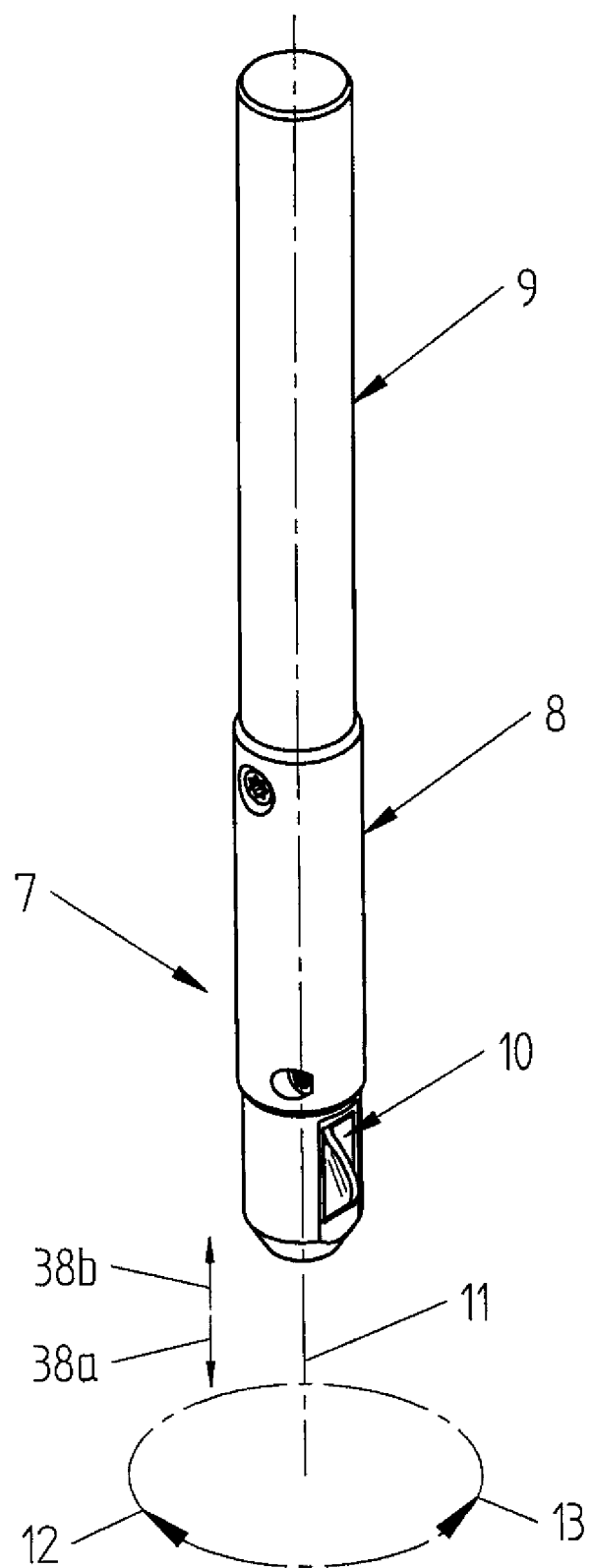
Figure 6:
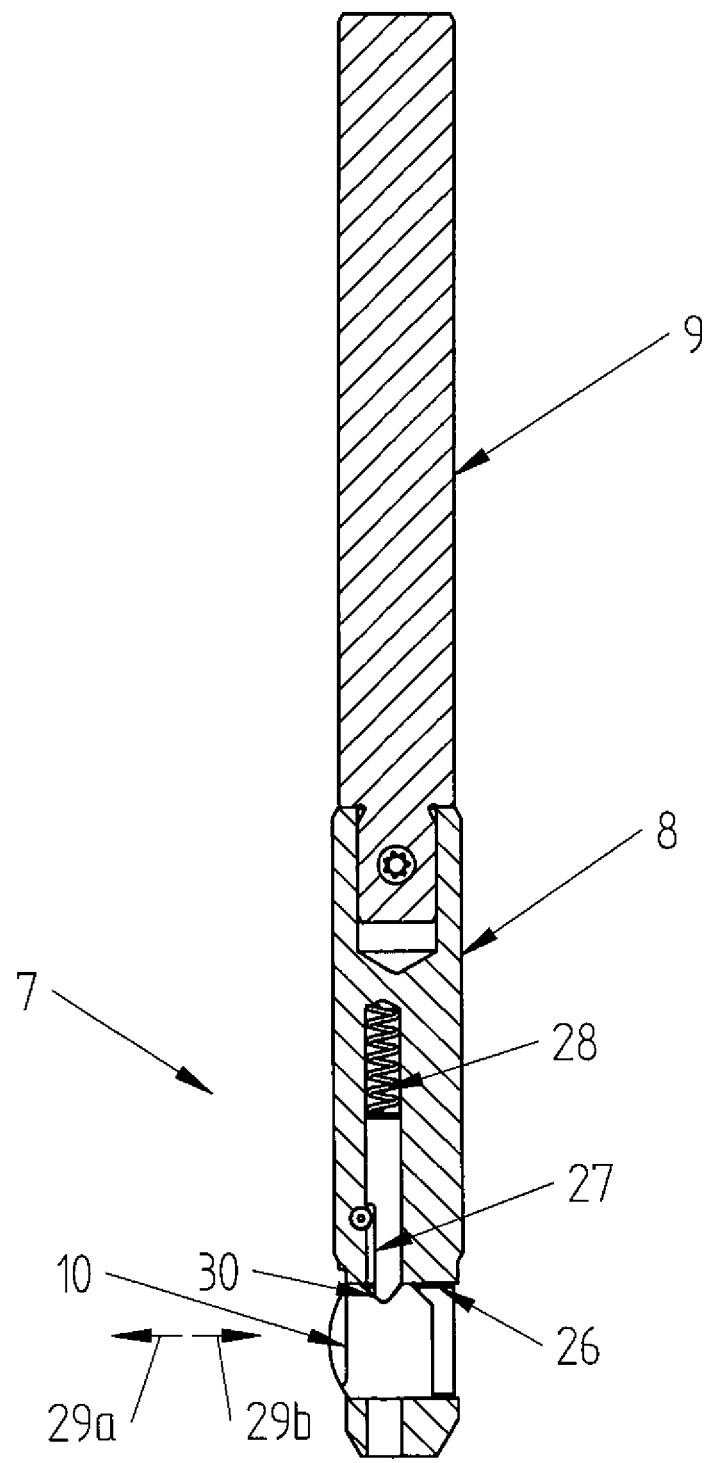

Shown are:

FIG. 1: a first embodiment, of how burrs can be removed outward from a main borehole FIG. 2: a second embodiment FIG. 3: a third embodiment FIG. 4: a fourth embodiment FIG. 5: a perspective view of the deburring tool as per the invention FIG. 6: a section through the deburring tool of FIG. 5

Figure 7:
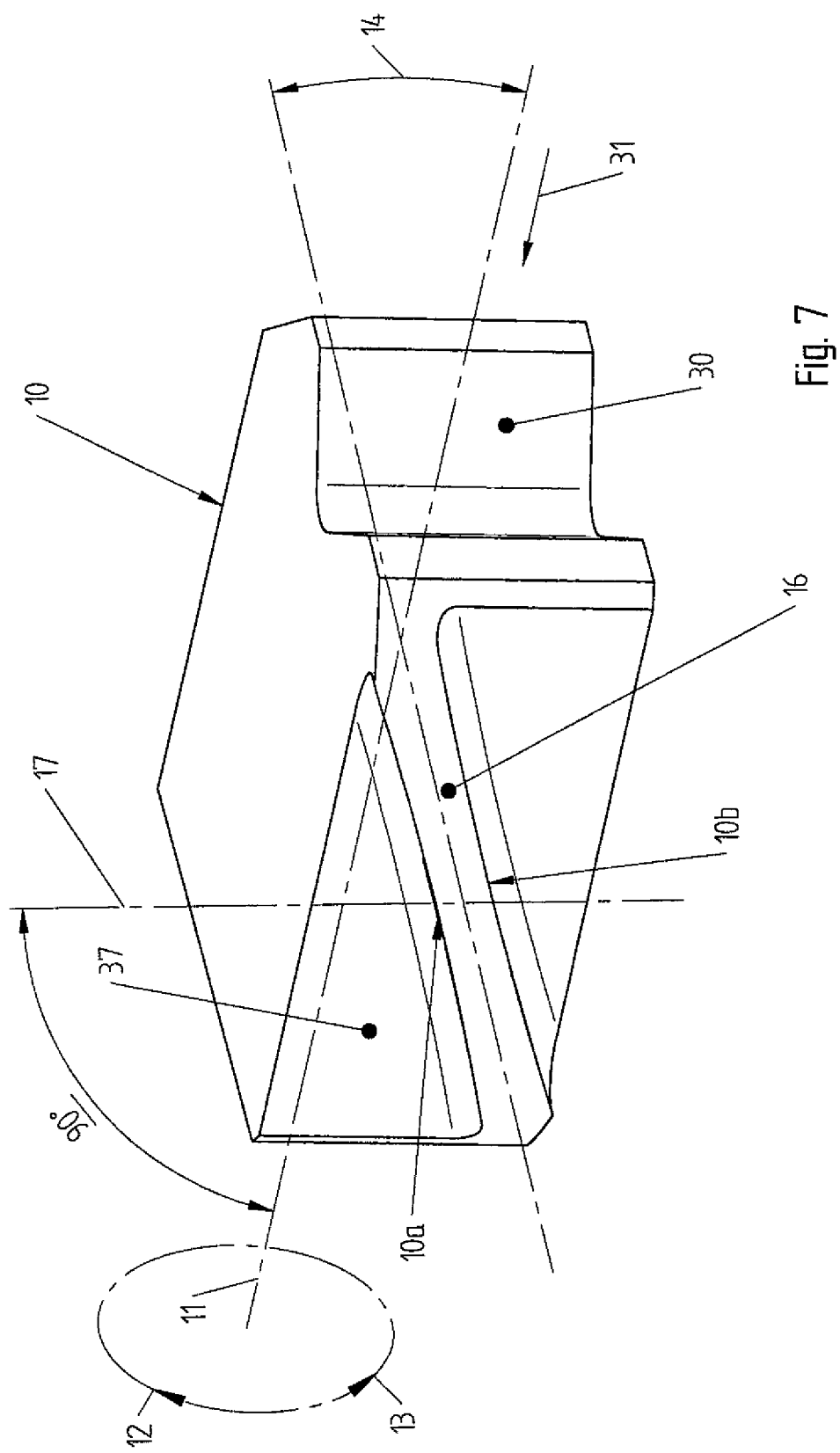

FIG. 7: the perspective depiction of the deburring knife

Figure 8:
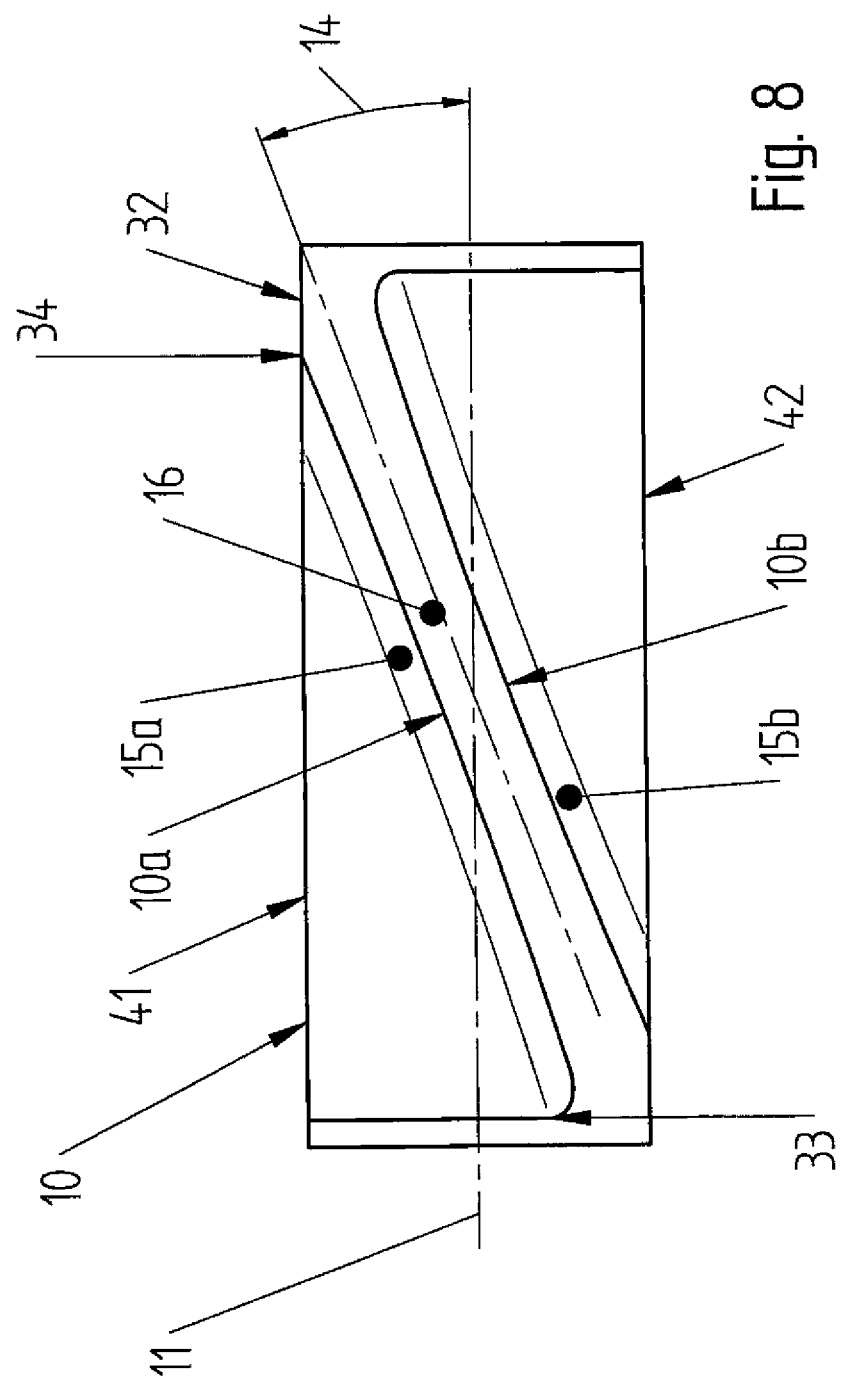
Figure 9:
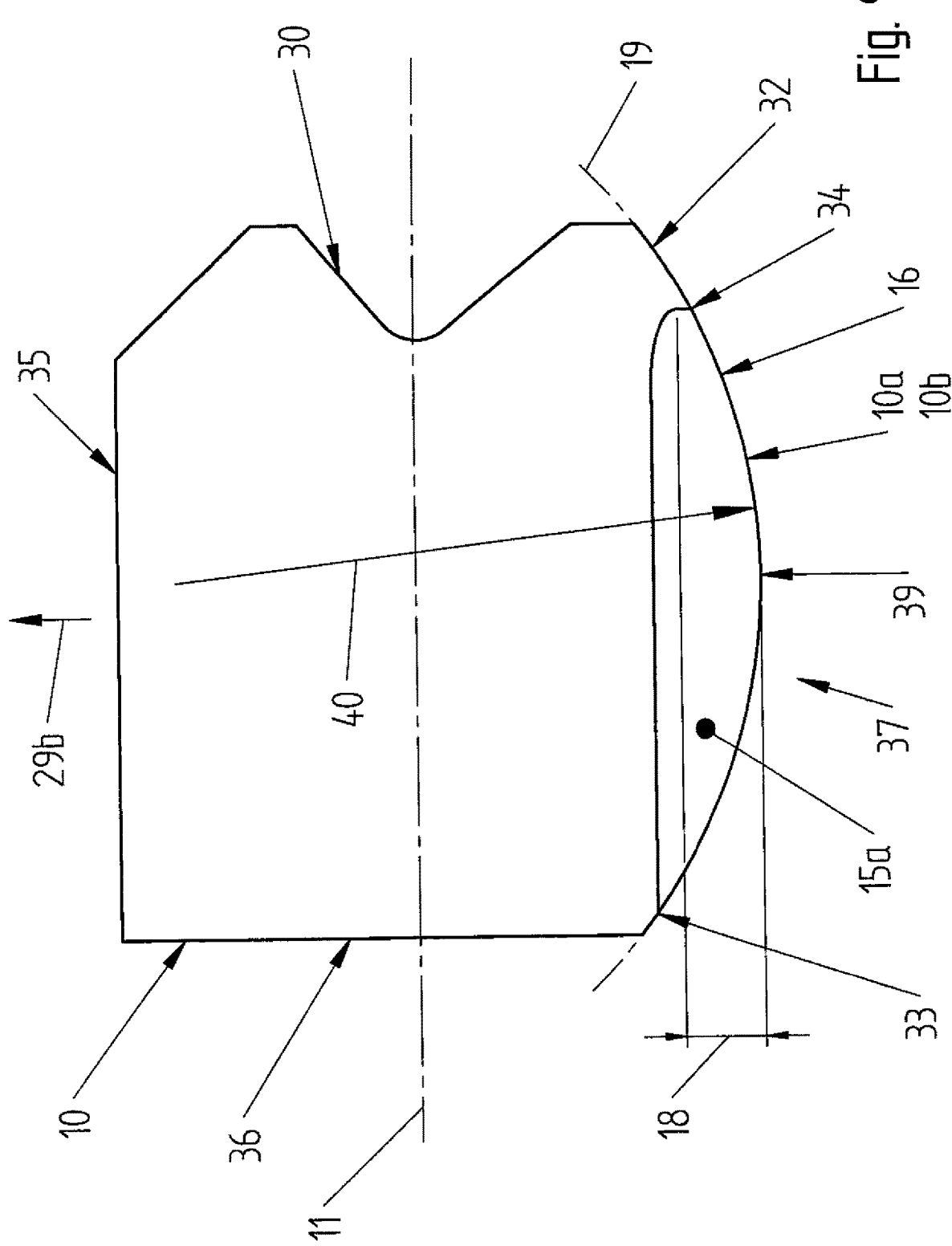

FIG. 8: the view of FIG. 7 turned by 90° with a top down view of the cutting edge FIG. 9: a view of the deburring knife turned by a further 90°

Figure 10:
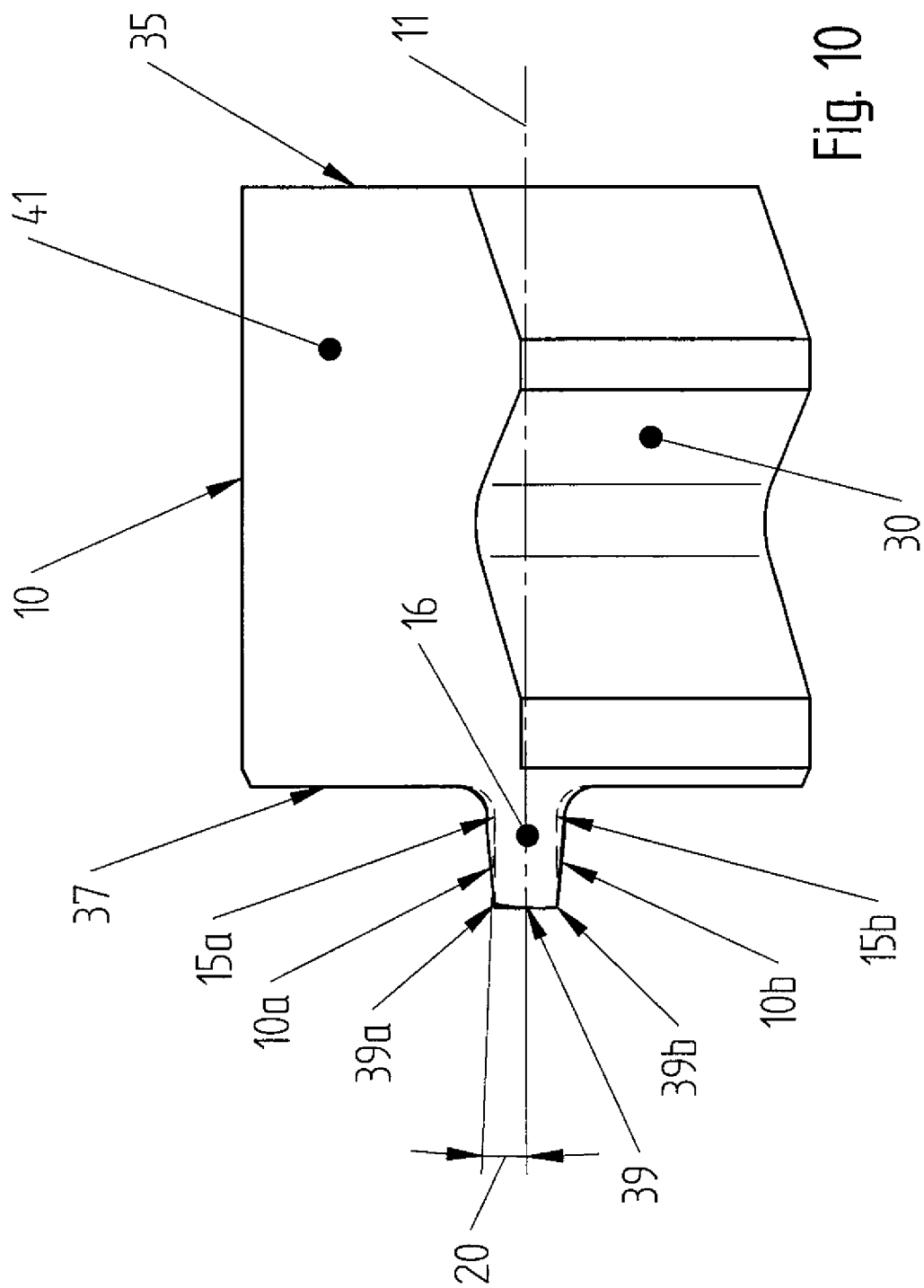
Figure 11:
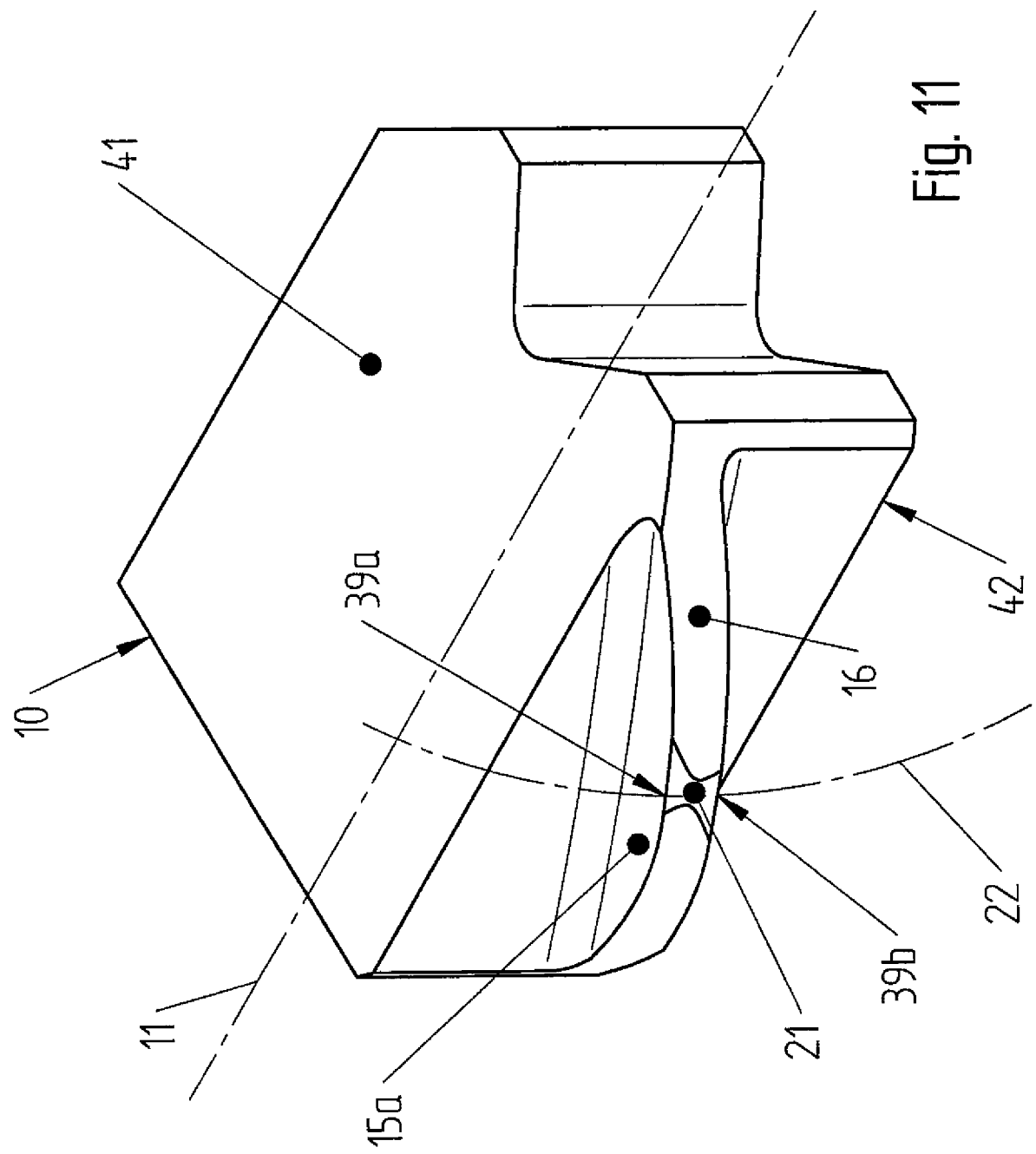
Figure 16:
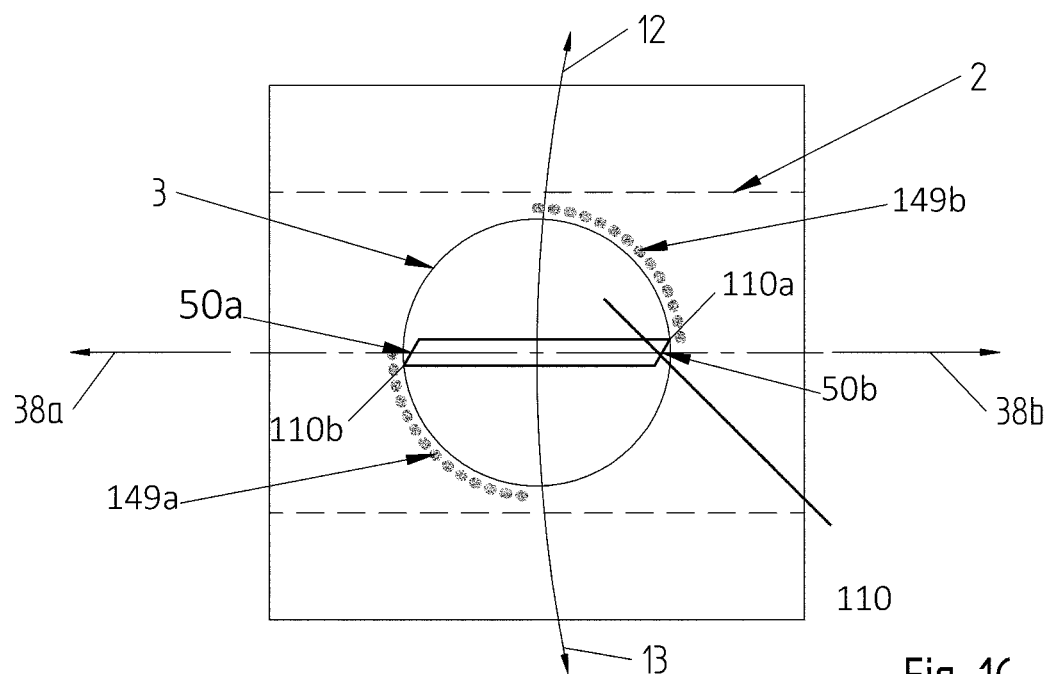

FIG. 10: a view turned vis-à-vis FIG. 9, to make clear the shaving angle FIG. 11: a spatial perspective depiction of the cutting knife with an additional feature FIG. 12: an embodiment version of the tool with two deburring knives parallel to each other FIG. 13: an embodiment altered from FIG. 12, in which two individual knives are arranged to lie serially over each other FIG. 14: a perspective drawing of the deburring process of the deburring knife when deburring the recess edges of a transverse recess FIG. 15: an embodiment altered from FIG. 14 in which, instead of a cylindrical borehole of FIG. 14, now an elongated recess is deburred FIG. 16: a view of a transverse recess of a work piece, and schematically a knife arranged in a main borehole from prior art, for example as per WO 2016/135283 A1

Figure 17:
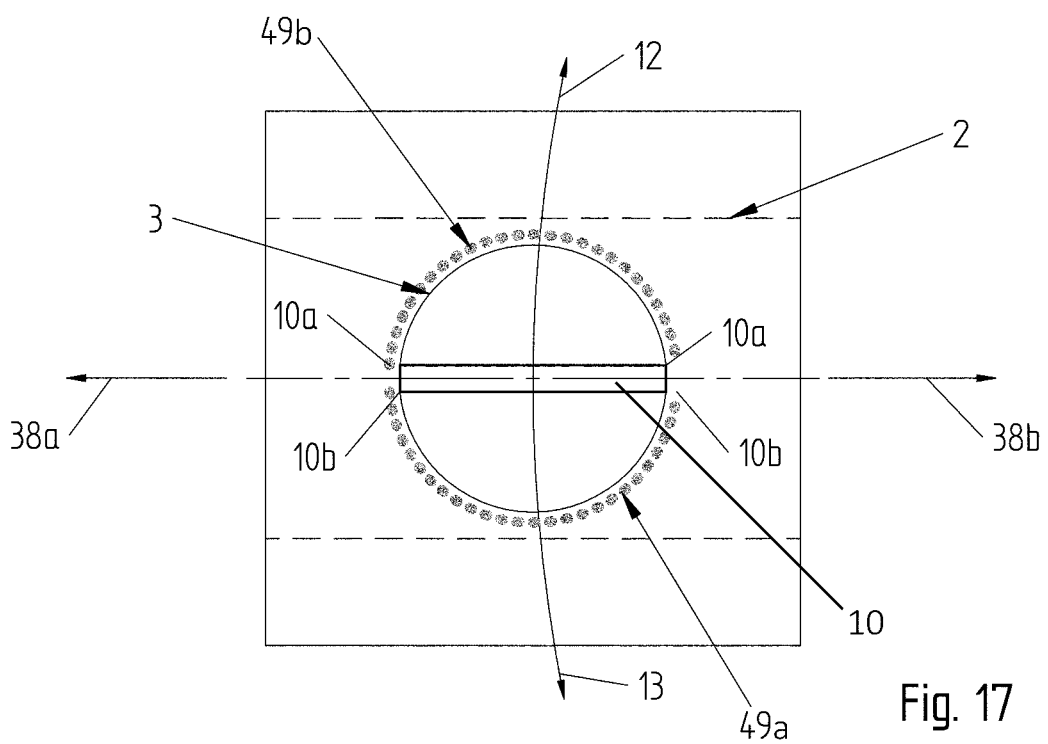

FIG. 17: a view of a transverse recess of the work piece and schematically a knife arranged in the main borehole as per the invention.

Any recesses 3 are deburred in the area of their recess edges 4 with the main borehole 2 in work piece 1 along main borehole 2, which intersect or penetrate in any form and angle.

The deburring tool 7 operates through main borehole 2, i.e. the knife 10 operates proceeding outward from main borehole 2 into the recesses 3.

The main feature of this deburring task is that the recess edges 4 are always arranged on the cylinder of main borehole 2 and intersect same, and thereby are always reachable for deburring tool 7 operating through main borehole 2.

Very many work pieces in the automotive and mechanical engineering fields possess so-called main boreholes 2 into which a plurality of lateral, so-called auxiliary boreholes 3 or auxiliary recesses penetrate. These are, for example, valve housings, drive and output shafts, and many others. The advantage of this tool concept is that operating through main borehole 2, all of the recesses 3 adjoining this main borehole can be deburred with the forward motion of the deburring tool in series with the rotationally driven deburring tool 7.

Examples of such recesses are shown in FIG. 1:

The recesses 3 can be configured in the form of transverse recesses, whose recess axis 3a runs at an angle 5 of 90° to main borehole axis 2a and penetrates through main borehole 2. There also are recesses 3d that run offset to main borehole axis 2a. there are also recesses 3d which run offset to main borehole axis 2a. Likewise recesses 3c, which completely penetrate main borehole 2 in offset fashion, thus extending out via them.

Further examples of the possible shapes of recesses re shown in FIG. 2:

Additional recesses 3c can be configured in the form of elongated holes, the recess axes 3a of which lie at an angle of 5 to 90° to main borehole axis 2a. Likewise, elongated hole recesses 3f, the recess position 3b of which run at any angle 6 up to parallel to main borehole axis 2a, are present.

Further examples of the possible shapes of recesses are shown in FIG. 3:

The recesses 3g can be configured in the form of transverse boreholes, the recess axes 3a of which run at any angle 5 to main borehole axis 2a down to the parallel, and penetrate through main borehole 2.

Further examples of the possible shapes of recesses are shown in FIG. 4:

The recesses 3h can be in the form of milled grooves which penetrate main borehole 2 at an angle of from 90° down to being parallel. Further recesses 3i can be configured in the form of slot grooves, whose straight-running longitudinal axes are parallel to main borehole 2 or lie at any angle.

After depicting the various deburring tasks and the options, employing FIGS. 1 to 4, in what follows the main features of the deburring tool are presented in briefly summarized form:

1. A knife 10 with two cutting edges 10a and 10b lying opposite in the rotational direction, acting for rightward passes 12 and leftward passes 13, which are set slanted about the angle 14 in a range between 0° and 90°, but preferably in a range between 5° and 45° to tool axis 11.
2. Two cutting edges 10a and 10b, formed from two opposite chipping depressions 15a; 15b and an arch-shaped, limiting control surface 16.
3. The orientation 17 of control surface 16 is orthogonal to tool axis 11.
4. A first possible variant: the two cutting edges 10a and 10b lying opposite in the rotational direction, acting for rightward 12 and leftward 13 passes are set at a slant 14 of 0° to 5° to tool axis 11.
5. A second possible variant: the orientation 17 of the control surface is defined between 70° and 90° to tool axis 11.
6. A glide surface 21 is attached at the vertex point of control surface 16 and has a radius 22 smaller equal to half the diameter of main borehole 2. By this mean the borehole wall is protected from texturing by the cutting edges at the vertex point.
7. The distance between the two opposite chipping depressions 15a and 15b preferably is 0.2 mm to 1 mm.
8. The chipping angle 20 of the two opposite chipping depressions 15a and 15b preferably has an angle between −20° and 20°.
9. The arch radius 19 of control surface 16 is dimensioned so that the cutting angle 25 is at most 45°, so that the particular acting cutting edge 10a or 10b inserts knife 10 along recess edge 4 radially in direction 24 into knife window 27.
10. The vertex point of knife 10 lying in the rebound position projects over the diameter of main borehole 2 maximally radially by the amount of arch height 18 of control surface 16.
11. The invention also claims a method for deburring of recesses 3 of any shape along main borehole 2 with longitudinal-side passage of the main borehole at first only in a rightward pass 12 and second only in a leftward pass 13.
12. Additionally the invention claims a method for deburring of recesses 3 of any shape along main borehole 2 with longitudinal-side passage of the main borehole initially in a leftward pass 13 and then in a rightward pass 12 or vice versa, initially in a rightward pass 12 and then following in a leftward pass 13.
13. The cutting motion 23 acting for paring shifts knife 10 radially in the direction 24 into knife window 27 and deburrs its recess edges.
14. The two opposite cutting edges 10a and 10b remove the burr from both sides, proceeding from the center of recess 3, 3a-i in the direction of recess edges 4.
15. The two opposite cutting edges 10a and 10b remove the burr from both sides, proceeding from outside the recess edges 4 in the direction of the recess center.

FIG. 5 shows a perspective embodiment of a first embodiment of a deburring tool, in which on a shaft 9 driven to turn, which can be driven to turn as desired in arrow directions 12 and 13, a base body 8 is attached, on the forward front end of which a knife window (see FIG. 6) is present, which is radially oriented to tool axis 11.

In the area of knife window 26, invention-specific knife 10 is arranged, which as per FIG. 6 is able to be extracted and inserted radially in spring-loaded fashion in arrow direction 29 from knife window 26.

Extraction is done against the force of a compression spring 28, which presses axially on a control bolt 27, the lower end of which is configured as a control surface which engages into a control recess 30 on the upper side of knife 10.

The free front end of spring-loaded control bolt 27 engages into control recess 30 in knife 10, and holds it in spring-loaded fashion in an extended, cutting state, as is depicted in FIGS. 5 and 6. Accordingly, knife 10 is depicted in FIGS. 5 and 6 in its active, cutting operational setting. When deburring tool 7 is inserted into main borehole 2, the borehole walls of the main borehole press knife 10 initially in the radial direction inwards into knife window 26, so that it is passive and no longer cuts.

Only when rotationally driven deburring tool 7 progresses farther axially into borehole 2 does it reach, while turning, the area of a transverse recess 3, 3a-3i, and there in the area of the recess edges of the transverse recesses, deburrs while progressing in the feed direction of deburring tool 7.

Instead of a spring-loaded shifting of deburring knife 7 with an assigned compression spring 28 and a control bolt 27 loaded by same, retaining or pretensioning means can also be used for knife 10. For example the knife can be held with the aid of a compressed fluid or an elastomer compression spring in the initial position depicted in FIG. 6, and brought against the force of the elastomer compression spring or of the compressed fluid or some other pretensioning medium into the working setting, as depicted in FIGS. 5 and 6.

In any case it is important that knife 10 is held in spring-loaded fashion by the pretensioning means in its cutting operating setting as per FIGS. 5 and 6, and upon entering main borehole 2, 2a, yields back by spring force, and upon entry into a transverse recess 3, 3a-3i which adjoins the wall of main borehole 2, 2a under the force of the pretensioning means is shifted into the active, cutting operating position shown in FIGS. 5 and 6.

It thus does not depend on the utilization of a compression spring 28 with a control bolt 27, but rather also other pretensioning means can be used for transverse shifting of knife 10 in the arrow directions 29.

Cylindrical compression spring 28 can also be replaced by other types of springs. Instead, for example, spiral springs, cup springs or any hydraulic or pneumatic pretensioning means can be used.

It is important that deburring knife 10, upon passing through main borehole 2 and upon making initial starting entry into transverse recess 3, engages the start of recess edge 4, and executes a paring cut due to the invention-specific slanted setting of the cutting edges of knife 10, through which, due to the axial forward feed of deburring tool 7 with simultaneous rotation, there is progressive continuous deburring of the recess edges in the particular transverse recess.

If for example, deburring tool 7 is inserted in a rightward pass as per turning direction 12 into main borehole 2, then knife 10 is engaged in its operational setting out of knife window 26 in arrow direction 29 to the right on both sides of recess edge 4.

In principle the knife, spring-loaded, engages on the inner diameter of main borehole 2 and as soon as it gets to the area of transverse recess 3, the burr found there on the edge is knocked off. Thereafter, knife 10 drops into the transverse recess and is fed still farther radially out of knife window 26, until, with its slanted cutting surface it runs up to the opposite edge of the transverse recess, and then is again pushed back against the spring force of the driving medium, for example spring 28, into knife window 26, and during this pushback motion it also pares away the burr on the transverse recess on the opposite side of the transverse recess.

This would be a process for example with the rightward pass of the deburring tool in turning direction 12.

If in contrast deburring tool 7 is driven in a leftward pass in turning direction 13, the opposite process occurs, namely that instead of knocking off the one side of the burr on the recess edge of transverse recess 3, now the other side is knocked off, and the opposite side of the recess edge in transverse recess 3 is now removed with a paring cut.

Accordingly, the knife cuts as per the invention on both sides and does not have a clearance angle on the one side, and a cutting surface on the other side, as in the prior art.

With arrangement of a clearance angle, the disadvantage is that the knife, which is provided for deburring, enters with this clearance angle into the transverse recess and there carries out no deburring, but rather simply pushes the burr found there into the transverse recess, without removing it.

For this reason it is essential that with the invention a knife 10 that does dual-sided cutting be present.

The above description emphasized that the cutting surface of the knife extends over the entire arc, and free, non-cutting intermediate surfaces are avoided. Accordingly, always the progressing cutting edge 10a (for the rightward pass) and cutting edge 10b (for leftward passes) are cutting on the overall surface of deburring knife 10.

FIG. 7 depicts such an invention-specific knife 10, in which the perspective view of the control recess 30 is shown, into which control bolt 27, shown in FIGS. 5 and 6, engages, and pretensions the entire knife 10 in arrow direction 31.

Due to this pretensioning, knife 10 is held in its active operational position as per FIGS. 5 and 6, and is pushed back by spring loading into its inactive setting in knife window 26, when one of the cutting edges 10a or 10b reaches recess edge 4 of transverse recess 3, 3a-3i.

It is preferred to have the two cutting edges be parallel to each other and assume a mutual distance to each other, and be oriented parallel at a slanted cutting angle 14 to tool axis 11.

Thus there is a paring cut in the area of the edges of transverse recess 3, 3a-3i, wherein in the rightward pass the cutting edge 10a extending over the entire length of cutting knife 10 carries out a paring cut, while in the leftward pass 13 the opposite, parallel cutting edge 10b, extending over the entire length of cutting knife 10, carries out a paring cut on the opposite edges of transverse recess 3, 3a-3i.

It is advantageous that cutting edges 10a, 10b extend in uninterrupted fashion, slanted and always progressing over the side edge of knife 10, and are neither segmented, nor interrupted nor configured to be discontinuous.

However, for technical reasons, cutting edges 10a, 10b do not extend over the entire side surface of knife 10, but rather, due to reasons of production technology, they start at an edge-side position 33, extend with arch shape, parallel to each other, and at a mutual distance over the entire side surface of knife 10, and go to the opposite, edge-side position 34, which ends shortly before the end of the knife body and there makes a transition into a concluding edge 32 that is not more precisely defined.

This concluding edge has no function, and it is present merely for manufacturing reasons.

According to FIGS. 7 to 9, between the two cutting edges 10a and 10b running parallel to each other, a convex, non-cutting control surface 16 is arranged.

Accordingly, both cutting edges 10a and 10b are part of a control surface 16, which as per FIG. 9 has a bead or arch progression, wherein on the far side and near side of control surface 16, the two cutting edges 10a, 10b are arranged in specular symmetry to each other as per FIG. 10.

Thus the two cutting edges 10a, 10b are part of a convex control surface 16 that projects out with arch shape, as is perceived in FIG. 9, and the ground section of cutting edges 10a, 10b is perpendicular to the longitudinal axis and axis of symmetry of control surface 16, i.e., this is a straight ground section, which is also designated as a cylindrical ground section.

This contrasts with prior art, as is perceptible from FIGS. 7 to 9, because cutting edges 10a, 10b extend roughly over the entire side edge of knife 10, and are arranged parallel and at a mutual distance to each other.

Thus cutting edges 10a and 10b cut over their entire effective length, which extends from position 33 to position 34 in FIG. 9.

The rear side 35 of the knife—see the inactive surface in FIG. 9—has no function whatever.

In another configuration of the invention, provision can be made that rear side 35 is configured with the same identical arrangement of cutting edges 10a and 10b as per FIG. 9, so that the result is a fully symmetrical (dual) knife 10 relative to tool axis 11, however then control recess 30, which in FIG. 9 is shown on the right side of the body of knife 10, also could be arranged on the left front side 36, to produce a turning knife, which, after turning by 180° as per FIG. 9, could then cut with the opposite cutting arrangement on rear side 35. Thus the simple knife 10 describe here can also be configured as a double knife, which, after wear occurs on cutting edges 10a and 10b on the front side, can be turned by 180 degrees, so that the additional cutting edges 10a, 10b attached on the rear side can be used.

In the prior art, it was not possible to configure such turning knives, which the present invention makes possible.

According to the embodiment of FIGS. 7 to 9, the invention makes provision for only a single cutting side 37, as depicted in FIG. 9, and in a variant of the embodiment not depicted in further detail, it is possible that this cutting side 37 could be arranged in specular symmetry to tool axis 11 on the opposite rear side 35.

To attain a paring cut, according to the invention provision is made that the cutting angle 14 be less than 90° In a preferred embodiment, the range can be between 5° and 45°.

In contrast, in the prior art, the cutting angle 14 was zero degrees, i.e. it extends parallel to the tool axis, which resulted in the impacting cut named previously in the introduction to the specification, which is to be avoided according to the invention.

Such an impacting cut would occur only in an undesired manner with parallel-running recess edges, while with slanted recess edges 4 and boreholes, there is no such impacting cut.

With the invention, due to the arrangement of the cutting angle to range between 5° and 45° in any case a paring action is obtained of cutting edges 10a and 10b along recess edge 4 with continued feed of deburring tool 7 in arrow direction 31 along main borehole 2.

Also essential with the invention is that deburring tool 7 as per FIG. 5, both in feed direction 38a forward, and in reverse direction 38b, performs a cutting action.

When as per FIG. 1, in feed direction 38a, deburring tool 7 enters main borehole 2, for example a forward feed is undertaken in arrow direction 38a in a rightward pass 12, which means that recess edge 4a that is first met in the forward direction is deburred, until subsequently in rightward pass 12, also the adjoining recess edges 4b are deburred, and additional recess edges which are all arranged in the area of transverse recesses 3.

When deburring tool 7 has then run through main borehole 2, it switches into a leftward pass (arrow direction 13), and knife 10 is withdrawn in the opposite direction to arrow direction 38a, namely in arrow direction 38b, out of main borehole 2.

If there still would be transverse recesses 3 relative to main borehole axis 2a on the opposite side, which is not the case in FIG. 1, in the leftward pass (turning direction 13), the transverse recesses lying on the right side of main borehole axis 2a are likewise deburred, if deburring tool 7 is withdrawn in arrow direction 38b in a leftward pass from main borehole 2.

However, the invention is not limited to this.

It is emphasized, however, that when deburring tool 7 enters in the arrow direction 38a feed direction in a rightward pass 12, also the transverse recesses 3 lying to the right and left of main borehole 2 with their recess edges 4 are deburred, and not merely the transverse recesses 3 that lie to the left of the main borehole.

A differing deburring action occurs only with the transverse borehole that adjoins the main borehole and intersects same, depending on whether the knife is drawn through borehole 2 in a rightward pass 12 in the forwards direction as per 38a or in leftwards motion 13 in the rear direction in 38b.

In any case, deburring action occurs on all of the transverse recesses 3, 3a-i adjoining onto main borehole 2, independent of whether these transverse recesses 3, 3a-i adjoin main borehole 2 on the left or right side, or not.

The process of knife 10 entering in arrow direction 38a in a rightward pass 12 and exiting in arrow direction 38b in a leftward pass merely promotes the quality of the deburring process of all transverse recesses, and therefore is only one advantageous version, to which the invention is not limited.

Thus it does not depend on whether recesses 3, 3a-i adjoin main borehole 2 on the left or right side or above or below. Consequently we are dealing only with forward-facing and backward-facing recess edges 4a, 4b, which are deburred with the first operational mode only in a rightward pass or with a second operational mode only in a leftward pass. When implementing only one of the two operational modes, the edges of recesses 3, 3a-i are unevenly deburred, which however does not impair the inventive concept.

However, when a third operational mode is used, in which deburring tool 7 runs inwards in the rightward pass and outwards in the leftward pass, all of the recess edges 4a, 4b of all recesses 3, 3a-i are uniformly deburred.

However with the first operational mode, if a backwards run in arrow direction 38b and a leftward pass 13 are dispensed with, all recess edges 4a, 4b of all transverse recesses are deburred, but with a different shaping.

It also emerges from FIG. 9 that a certain arch height 18 of control surface 16 is present, with arch height 18 able to be altered in large dimensions.

Accordingly, with the invention it is important that constantly convex curves be present with arch radius 19 of control surface 16 and the immediately adjoining cutting edges 10a and 10b, because only with formation of an arch-shaped convex and constant configuration of these curves can there be a uniform paring deburring action.

In contrast if arch radius 19 with its control surface 16 has discontinuous surfaces, deburring will be discontinuous and impactful. Regarding vertex point 39, this is a fully symmetrical control surface 16, which uniformly adjoins on the left and right side of vertex point 39.

In the embodiment as per FIG. 9, an additional embodiment is provided, that the right side beyond vertex point 39 of control surface 16 and cutting edges 10a and 10b found there, is shorter than the areas of cutting edges 10a and 10b that adjoin on vertex point 39 adjoining on the left and control surface 16 belonging to them.

Thus it is not necessary for the solution that in regard to a symmetrical vertex point 39, control surface 16 and cutting edges 10a and 10b be equally long and symmetrically configured.

From this it follows that cutting radius 40 forms a constant arch surface of control surface 16 and of adjoining cutting edges 10a and 10b immediately parallel and symmetrical thereto.

The embodiment shown is partially circular cutting edges 10a and 10b with a certain cutting radius 40, to which the invention is not limited, however.

Cutting edges 10a and 10b can, for example, also be configured as ovals or parabolas.

The height of the arch 18 must ensure that knife 10 with its cutting part, namely with cutting edges 10a and 10b, as well as with non-cutting control surface 16 lying in between, can actively be deployed from knife window 26, without lateral, non-cutting parts of knife 10 colliding with parts of the work piece.

FIG. 10 shows the situation as per FIGS. 7 to 9 in another view, where it can easily be perceived that roughly arch-like cutting edges 10a and 10b lie opposite each other in specular symmetry, in fact on the other side of tool axis 11 and lying between the convex arch of control surface 16.

Thus, control surface 16 projects out radially over cutting side 37, and the two cutting edges 10a and 10b are configured to be specularly symmetric and central to the center point of control surface 16.

The invention is not limited to a specularly symmetric configuration of the two cutting edges 10a and 10b lying opposite relative to tool axis 11.

In another configuration provision can be made that cutting edge 10a has a greater distance to tool axis 11 than cutting edge 10b, comparatively.

Likewise, in another configuration, provision can be made that cutting edge 10a has a different cutting radius than cutting edge 10b, comparatively.

Thus it is not mandatory and necessary to the solution that they have specular symmetry to each other. However, for manufacturing reasons it is preferred if the two cutting edges 10a and 10b be configured to be specularly symmetric in regard to central convex control surface 16.

In FIG. 10, a vertex surface 41 is depicted as a straight surface of control surface 16. This vertex surface 41 is a flat curve or a flat surface, which in fact could also be configured concave.

It is advantageous that the first contact surface of knife 10 is in main borehole 2 and thereafter in transverse recess 3 extending transverse thereto at position 33 or 34.

Likewise the non-cutting final edge 32 could adjoin the inner circumference of the borehole, but this has no cutting function whatever. Final edge 32 could, however, perform a control function, in that the knife in arrow direction 29 is pressed into knife window 26 in spring-loaded fashion.

Vertex point 39 of control surface 16 does not touch the inner circumference of main borehole 2, because this is an arch-shaped borehole.

A chip slope 20 is defined with reference symbol 20. Chip slope 20 is the angle of the chip surface in the direction of cutting edge 10a and 10b.

Chip slope 20 is important for cutting various materials, because it is with it that chip removal of the material produced during cutting is determined. This also determines the edge life of the tool.

Laterally chip depressions 15a and 15b adjoin cutting edges 10a and 10b, to take out and away chips removed by cutting edges 10a and 10b. Thus these are chip guidance steps.

It is important that control surface 16 is at an angle 17 of 90° for example to tool axis 11 and to the knife axis, because this ensures that knife 10 cuts uniformly in the leftward and rightward passes.

No components or surfaces arranged on the upper side 41 of knife 10, because this upper side 41 is a guidance surface in knife window 26 for the sliding guide. This also holds true for the underside 42 of knife 10, because also underside 42 represents a guidance surface for the sliding guide in knife window 26 of deburring tool 7.

As compared to FIG. 10, FIG. 11 shows an altered embodiment, namely in such a way that control surface 16 penetrates fully through, but in the central area of control surface 16 an additional gliding surface 21 is arranged.

Consequently this is the previously defined vertex point 39, which carries out a cutting action in the area of the particular recess edge 4 in the area of transverse recess 3.

According to the invention, in the altered embodiment as per FIG. 11, exactly at this vertex point 39, a non-cutting gliding surface 21 is arranged.

Accordingly, gliding surface 21 interrupts the arch shape of the otherwise constant continuous cutting edges 10a and 10b, because at this vertex point 9 a non-cutting gliding surface 21 is present, which penetrates both the control surface 16 and the arched shape of cutting edges 10a and 10b.

Thus at vertex point 39 the two opposite cutting edges 10a and 10b are configured not to cut, because invention-specific gliding surface 21 is configured there.

This has an advantage in that damage to main borehole 2 by the two vertex points 39a and 39b (see FIG. 10) of cutting edges 10a, 10b cannot occur.

Thus there is a central non-cutting area of cutting edges 10a and 10, situated at the vertex point, which however is only one embodiment, while in the other embodiment a through-running, arch-shaped cutting area of the two cutting edges 10a and 10b lying opposite each other is provided.

In FIG. 11, the two non-cutting vertex points 39a and 39b are inscribed, and according to this embodiment, they are displaced back, so that they are outside the cutting area of cutting edges 10a and 10b.

FIGS. 12 and 13 show further embodiments of the invention, with varied cutting knives 10, 10', 10" depicted in these figures, wherein knife 10 depicted there is able to be configured according to all the embodiments that were previously described.

FIG. 12 depicts a first knife 10', which is arranged back to back with a second knife 10" in knife window 26. Thus all of the previously indicated descriptions—related to knife 10—are also valid for the dual arrangement of two knives 10', 10", arranged to be specularly symmetric to each other.

With this embodiment, the two slanted cutting edges 10a and 10b are arranged parallel to each other and are divided into two different knives.

Thus this is a tandem arrangement of two identically configured knives 10' and 10", which are arranged exactly parallel and back to back.

The two knives 10' and 10" are impinged on by different control bolts 27 with different compression springs 28, and thus, separate from each other and independent of each other, can be slid out of knife window 26 and into knife window 26, under the load of differing compression springs 28.

It is preferred if the compression springs 28 parallel to each other are configured to be identical, with the invention not being limited to this, however.

The advantage of this tandem arrangement is that it produces a longer edge life and a better surface quality, because there is a dual paring deburring cut.

In an alternative to the embodiment as per FIG. 12, FIG. 13 depicts that the previously described knives 10 can be arranged in all the versions, i.e. thus also in the tandem arrangement of knives 10' and 10" lying axially one above the other at a mutual interval 43. With this the front knife 10''' moves ahead in main borehole 2 and already has deburred a part of transverse recesses 3, 3a-i terminating in main borehole 2, while rear knife 10"" now undertakes the refined work of deburring of recess edges 4 in the area of transverse recesses 3, 3a-i.

Here it is also preferred if knives 10, 10' 10", 10''' 10"" are arranged to be spring-loaded by various, separate control bolts and compression springs 28 in base body 8 of deburring tool 7. The invention however is not limited to this.

In another embodiment, provision can be made that for example the one knife 10''' is configured with cutting edges of cutters 10a and 10b inclined to the left, while upper knife 10"" with cutting edges of cutters 10a and 10b is inclined to the right.

This has an advantage in that a paring cut with recess edges 4 to be deburred occurs in a forward pass by lower knife 10''' on front recess edge 4, and with following knife 10"" likewise by cutting edges 10a and 10b inclined in the opposite direction. Thus, the quality of the deburring can be still further improved.

This means that for example with the upper knife 10"", cutting angle 14 does not have a positive value, as FIG. 7 depicts, but rather a negative value that is below tool axis 11.

In one embodiment, FIG. 14 shows the deburring of a cylindrical transverse recess. It is shown that arch-shaped cutting edges 10a, 10b first engage into the start of transverse recess 3 with forward feed of deburring tool 7.

According to FIG. 14, knife 10 makes progressive paring cuts in arrow direction 23 between positions 44 and 45 along a contact line.

The contact points at positions 44 and 45 run toward each other, and in particular in arrow directions 23, until at arrow direction 24 cutting knife 10 runs out of transverse recess 3 first at vertex point 39.

FIG. 14 now shows that there is a certain radial distance between arch radius 19 of the control surface and recess edge 4 of transverse recess 3 to be deburred.

Upon touching these two curves 19, 4 a cutting angle 25 is produced.

Cutting angle 25 may not be too small; it thus must be an angle that is greater than 0, because otherwise there would not be a paring cut of cutting edges 10a and 10b along recess edge 4.

It also must not be greater than 45°, yet greater than 0, because otherwise a flat stroke of cutting edges 10a and 10b would occur on recess edge 4.

An altered embodiment of FIG. 14 is depicted in FIG. 15, where the same reference symbols are applied for the same conditions. For the sake of simplification, however, not all reference symbols are drawn in the same parts.

At any rate FIG. 15 shows that instead of a cylindrical transverse recess 3, now a milled recess or an elongated hole can be deburred in the same way. This is an elongated hole, the longitudinal axis of which is parallel to main borehole 2 and to main borehole axis 2a, and thus also parallel to tool axis 11.

The front cutting edge 10a is seen in a side view, and it covers cutting edge 10b that lies behind, with the two cutting edges 10a and 10b being spatially separated from each other by control surface 16.

In this elongated transverse recess 3 there is only one more contact point with cutting edges 10a and 10b at position 44, and an intersection angle 25 resulting from this. Cutting edges 10a and 10b thus run at a slant at angle 14 to recess edge 4, and thus cutting edges 10a and 10b make a paring, chip-removing motion along the edge of recess edge 4.

Thus, position 44 advances forward in the longitudinal direction, i.e. in the arrow direction of cutting motion 23.

Thus it is clear from FIG. 15 that knife 10 with its cutting edges 10a and 10b, from the area of position 44, cuts up to vertex point 39 and then with continued turning, for example in a rightward pass 12, it leaves recess edge 4 and with the forward feed of deburring tool 7 in feed direction 38a, 38b, it again enters recess 3, but at another place, for example that the vertex point, now progressing, is in setting 39' and then likewise a deburring action takes place at the margin of recess edge 4, as long as, as with the next rotation of the knife, again vertex point 39' has migrated leftward, to thus deburr the recess edge 4 in sequence and continuously.

Thus the deburring action occurs approximately from position 44 to vertex point 39, before knife 10 leaves the margin of recess edge 4 and, with another revolution of the tool in arrow direction 12, enters into transverse recess 3 and, for example, at position 39', another deburring action occurs up to position 39'. With the axial forward feed of deburring tool 7, sequentially the surfaces of recess edge 4 are deburred in arrow direction 23, as this is depicted in arrow direction 23 in FIG. 15.

It was already explained above that for example in the rightward pass, both edges 47, 48 of recess edge 4 are also deburred, only on front edge 47 another paring deburring action occurs in comparison to the knocking-off action on the rear edge 48. However, this holds true only for the rightward pass.

If in contrast deburring tool 7 is run in a leftward pass (arrow direction 13), the deburring action that previously was described using front edge 47 with paring action, now occurs on the opposite rear side 48, and on front side 47, the other deburring action, of a knockoff nature, takes place.

In this way, with a leftward and rightward pass of deburring tool 7 in arrow directions 12 and 13, on both edges 47 and 48 of a recess edge 4 of any transverse recess 3, deburring actions occur simultaneously, but in a different way.

FIG. 16 shows a view of a transverse recess 3 of a work piece 1 and, schematically, a knife 110 arranged in main borehole 2 as per the prior art, for example according to WO 2016/135283 A1.

Knife 110 is part of a deburring tool (not shown) which is able to be run in forward feed direction 38a and also in reverse direction 38b, within main borehole 2. The deburring tool and knife 110 arranged thereon can be run in a rightward pass 12 and leftward pass 13, with knife 110 rotating in the rotary directions of rightward pass 12 and leftward pass 12 about the mid-longitudinal axis of main borehole 2.

Knife 110 comprises two cutting edges 110a and 110b arranged next to each other. Due to the clearance angles 50a and 50b between cutting edge 110a and cutting edge 110b, in forward feed direction 38a and reverse direction 38b of knife 110, only one cutting edge 110a or 110b cuts, both in rightward pass 12 and leftward pass 13 of knife 110.

If knife 110 is moved in forward direction 38a, then in leftward pass 13 only front cutting edge 110b of knife 110 is acting, while rear cutting edge 110a has no function due to clearance angle 50a. Cutting edge 110b consequently has only the effective area 149a depicted by dots. In the opposite instance, when for example knife 110 is driven in forward direction 38a in rightward pass 12, no cutting action occurs.

If, in contrast, knife 110 is run in reverse direction 38b, i.e. with a reverse stroke motion, in rightward pass 12, then reverse cutting edge 110a cuts and covers the depicted effective area 149b. But if knife 110 is run in reverse stroke 38b in leftward pass 13, the other cutting edge 110b, due to clearance angle 50b, has no function and no cutting action occurs.

Consequently the one cutting edge 110b of knife 110 only cuts in leftward pass 13 in forward direction 38a, while the other cutting edge 110a cuts only in rightward pass 12 in reverse direction 38b. It is not possible for both cutting edges 110a, 110b to cut in forward stroke 38b both in rightward pass 12 and also in leftward pass 13.

FIG. 17 shows a head on view of transverse recess 3 of work piece 1 and, schematically, a knife 10 as per the invention, arranged in main borehole 2.

Cutting edges 10a, 10b, according to the invention have no clearance angle, thus it is possible that the two cutting edges 10a, 10b lying next to each other, can perform a cutting action in forward stroke 38a in rightward pass 12 and in leftward pass 13, and also in rearward stroke 38b in rightward pass 12 and in leftward pass 13.

Cutting edge 10b cuts in leftward pass 13 both in forward motion 38a and in rearward motion 38b. Cutting edge 10a cuts in rightward pass 12 both in forward motion 38a and in rearward motion 38b of knife 10.

Cutting edges 10a and 10b consequently have an effective area 49a and 49b, which covers the entire edge of the transverse recess. Thus the entire edge of the transverse recess is deburred.

SYMBOLS LEGEND 1 work piece
2 main borehole
2a main borehole axis
3 transverse recess
3a recess axis
3b recess position
3c recess
3d recess
3e recess
3f recess
3g recess
3h recess
3i recess
4 recess edge
5 angle recess axis—main borehole axis
6 angle recess position—main borehole axis
7 deburring tool
8 base body
9 shaft
10 knife 10', 10"
10a cutting edge rightward pass
10b cutting edge leftward pass
11 tool axis
12 rightward pass turning direction
13 leftward pass turning direction
14 cutting angle
15a chipping depression rightward pass
15b chipping depression leftward pass
16 control surface
17 control surface orientation
18 arch height control surface
19 arch radius control surface
20 chip slope chipping depression
21 gliding surface
22 radius, gliding surface
23 cutting motion
24 direction
25 intersection angle
26 knife window
27 control bolt
28 compression spring
29 arrow direction
30 control recess
31 arrow direction
32 final edge
33 position
34 position
35 rear side
36 front side
37 cutting side
38 forward feed direction a, b
39 vertex point 39a, 39b
40 cutting radius
41 upper side
42 lower side
43 distance
44 position
45 position
46 contact line
47 front edge of 4
48 rear edge of 4
49a effective area
49b effective area
50a clearance angle
50b clearance angle
110 knife
110a cutting edge
110b cutting edge
149a effective area
149b effective area

The invention claimed is:

1. A deburring tool for deburring of edges of transverse recesses, which diverge from a main borehole, comprising a shaft driven to turn about the tool axis, which is deployable and retractable in a forward feed direction into the main borehole, and on the lower end of which at least one knife window is arranged, in which at least one spring-loaded knife is arranged roughly perpendicular to the tool axis, so as to be shiftable, which on its front end has two cutting edges (10a, 10b) which encounter the edge of the transverse recess (3, 3a-i), and deburrs same, wherein the two cutting edges are opposite in the rotational direction, which act to cut equally for the right and left passes, with one cutting edge being configured to cut for the rightward pass, both in forward motion and in rearward motion, and the other cutting edge being configured to cut for the leftward pass, both in forward motion nd in rearward motion, and that the two cutting edges are placed at a slant and with arch shape at an angle between 0° and 90° to the tool axis and thus to the longitudinal axis of the main borehole.

2. The deburring tool of claim 1, wherein the two cutting edges are configured to be
   a) constantly continuous and
   b) arch shaped and
   c) convex,
   so that a paring, chip-removing deburring occurs of the edges of the transverse recess.

3. The deburring tool of claim 1, wherein the two cutting edges are formed from two opposing chip depressions and an arch-shaped limiting control surface.

4. The deburring tool of claim 3, wherein a gliding surface is attached at a vertex point of the control surface and has a radius smaller than or equal to half the diameter of the main borehole.

5. The deburring tool of claim 4, wherein the vertex point of the knife lying in a rebounded (active) position projects out radially over the diameter of the main borehole by the amount of an arch height of the control surface.

6. The deburring tool of claim 3, wherein an arch radius of the control surface is so dimensioned that the intersection angle between the arch radius and a recess edge is at most 45°, so that the acting cutting edge inserts the knife along the recess edge radially in the direction of the knife window.

7. The deburring tool of claim 1, wherein in the knife window, two identical knives are supported back to back so as to be shiftable.

8. The deburring tool of claim 1, wherein in the shaft of the deburring tool, multiple knives are supported so as to shift laterally at an axial distance.

9. The deburring tool of claim 1 wherein the angle is between 5° and 45°.

10. A method for operating a deburring tool to deburr the edges of transverse recesses, which diverge from a main borehole, the deburring tool comprising a shaft driven to turn about the tool axis, which is deployable and retractable in a forward feed direction into the borehole, and at the lower end of which at least one knife window is arranged, in which at least one knife is arranged so as to be shiftable, approximately perpendicular to the tool axis, that on its front end has two cutting edges, which encounter the edge of the transverse recess and deburrs same, the method comprising rotating the deburring tool about the tool axis such that the deburring of arbitrarily shaped recesses along the main borehole with longitudinal side passage of the main borehole occurs only in a rightward pass and/or only in a leftward pass, or that first in a leftward pass and then in a rightward pass, or vice versa, first in a rightward pass and thereafter following in a leftward pass deburring occurs, with the knife with the two cutting edges simultaneously deburring in a rightward pass and in a leftward pass.

11. The method of claim 10, wherein a paring-acting cut motion inserts the knife radially in direction into the knife window, and thus deburrs its recess edges so that a paring, chip-removing deburring occurs of the edges of the transverse recess.

12. The method of claim 10, wherein the two opposing cutting edges of the knife remove the burr from both sides, proceeding from the center of the recess in the direction of the recess edges.

13. The method of claim 10, wherein the two opposing cutting edges of the knife, remove the burr from both sides, proceeding from outside the recess edges in the direction of the recess center.

14. The method of claim 10, wherein with further axial progress into the main borehole of the deburring tool driven while turning it, gets into the area of a transverse recess and there progressively deburrs the recess edges of the transverse recesses in the forward feed direction of the deburring tool.

15. The method of claim 10, wherein the knife, spring-loaded by a pretensioning means in its cutting operational setting and upon entering into the main borehole, retracts back by spring-loading and upon entering into a transverse recess adjoining on the wall of the main borehole under the force of the pretensioning means, is shifted into an active, cutting operating position.

* * * * *

UNITED STATES PATENT AND TRADEMARK OFFICE
CERTIFICATE OF CORRECTION

PATENT NO. : 10,981,237 B2
APPLICATION NO. : 16/275080
DATED : April 20, 2021
INVENTOR(S) : Harry Studer It is certified that error appears in the above-identified patent and that said Letters Patent is hereby corrected as shown below:

In the Specification

Column 1, Line 29, delete:
"The known debarring tool could also be …",
Insert:
--The known deburring tool could also be …--.

Column 2, Line 48, delete:
"… edge extends with constantly convexity …",
Insert:
--… edge extends with constant convexity …--.

Column 3, Lines 40-41, delete:
"If, as per the prior art, the cutting edge of the deburring tool were segmented, there would …",
Insert:
--If, as per the prior art, the cutting edge of the deburring tool was segmented, there would …--.

Column 4, Line 28, delete:
"… detail using drawings depicted multiple embodiment paths.",
Insert:
--… detail using drawings depicting multiple embodiment paths.--.

Column 5, Lines 26-28, delete:
"There also are recesses 3d that run offset to main borehole axis 2a. there are also recesses 3d which run offset to main borehole axis 2a.",
Insert:
--There are also recesses 3d that run offset to main borehole axis 2a.--.

Column 5, Lines 31-32, delete:
"Further examples of the possible shapes of recesses re shown in FIG. 2:", Signed and Sealed this
Eleventh Day of April, 2023

Katherine Kelly Vidal
*Director of the United States Patent and Trademark Office*

CERTIFICATE OF CORRECTION (continued)
U.S. Pat. No. 10,981,237 B2

Insert:
--Further examples of the possible shapes of recesses are shown in FIG. 2.--.

Column 9, Line 19-20, delete:
"Thus the simple knife 10 describe here can also be configured as a ...",
Insert:
--Thus the simple knife 10 described here can also be configured as a ....--.

Column 9, Lines 32-34, delete:
"To attain a paring cut, according to the invention provision is made that the cutting angle 14 be less than 90° In a preferred embodiment, the range can be between ...",
Insert:
--To attain a paring cut, according to the invention provision is made that the cutting angle 14 be less than 90°. In a preferred embodiment, the range can be between ....--.

Column 12, Lines 5-6, delete:
"No components or surfaces arranged on the upper side 41 of knife 10, because this ...",
Insert:
--No components or surfaces are arranged on the upper side 41 of knife 10, because this ....--.

In the Claims

Column 16, Line 64, Claim 1, Line 16, delete:
"... both in forward motion nd in rearward motion, and that the ...",
Insert:
--... both in forward motion and in rearward motion, and that the ....--.

Column 18, Lines 21-22, Claim 13, Lines 1-2, delete:
"The method of claim 10, wherein the two opposing cutting edges of the knife, remove the burr from both sides, ...",
Insert:
--The method of claim 10, wherein the two opposing cutting edges of the knife remove the burr from both sides, ....--.